Figure 5:
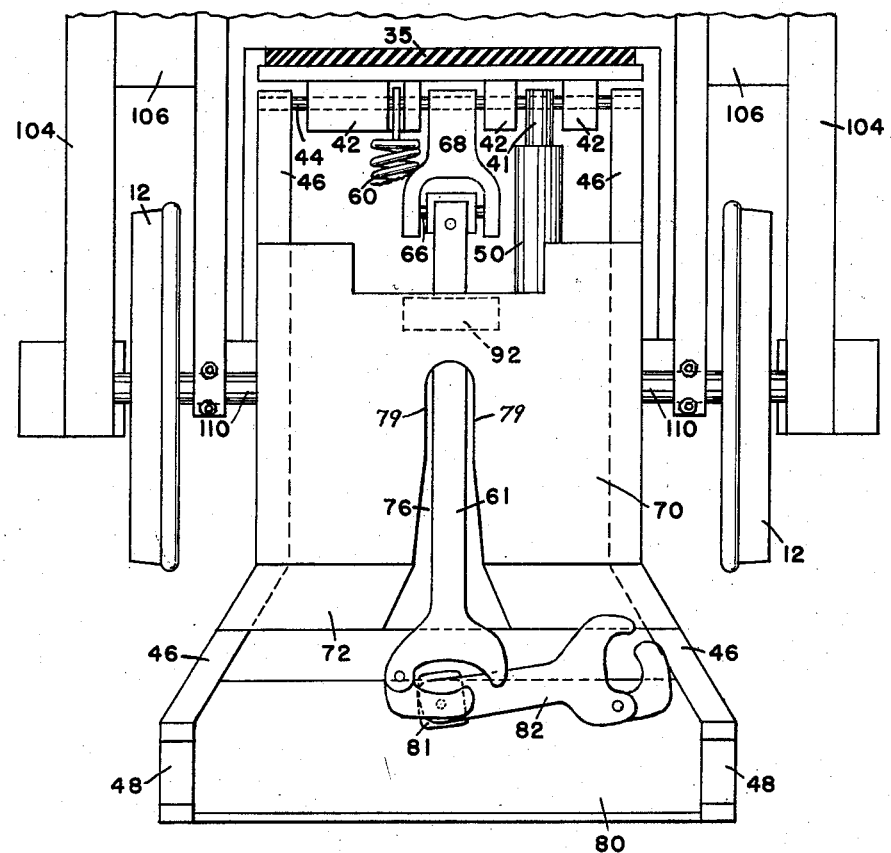

July 22, 1958 C. L. MADDEN 2,844,108
TRAILER TRAIN
Filed Oct. 25, 1954 3 Sheets-Sheet 1
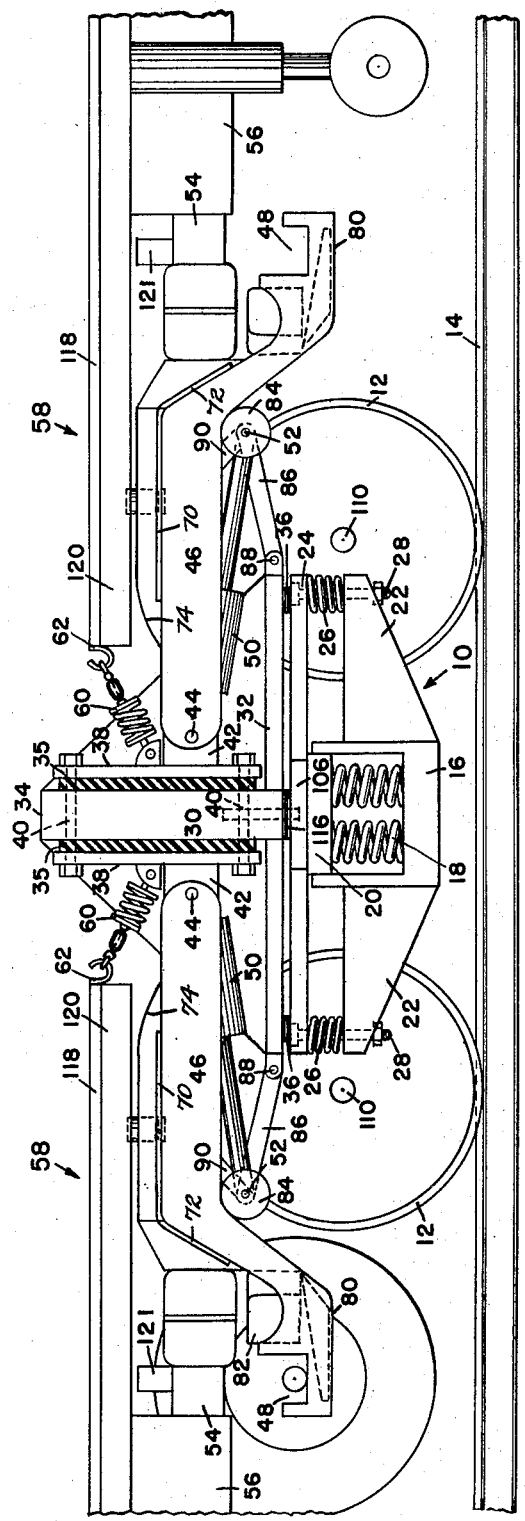
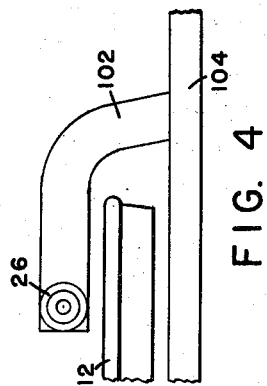
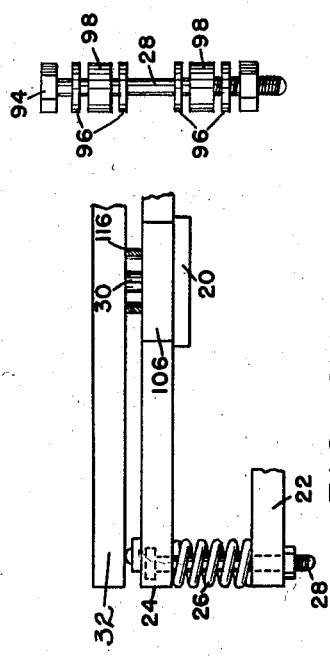
INVENTOR.
CHARLES L. MADDEN
BY H. F. Woodward
atty.

July 22, 1958  C. L. MADDEN  2,844,108
TRAILER TRAIN
Filed Oct. 25, 1954  3 Sheets-Sheet 2

INVENTOR.
CHARLES L. MADDEN
BY H. D. Woodward
atty.

July 22, 1958

C. L. MADDEN 2,844,108

TRAILER TRAIN

Filed Oct. 25, 1954

3 Sheets-Sheet 3

INVENTOR.
CHARLES L. MADDEN

BY *H. F. Woodward*
*atty.*

United States Patent Office 2,844,108
Patented July 22, 1958

2,844,108
TRAILER TRAIN
Charles L. Madden, Minneapolis, Minn.
Application October 25, 1954, Serial No. 464,370
8 Claims. (Cl. 105—159)

This invention relates to what for convenience may be called a trailer train. A trailer train can be a single unit or a multiple of units making up a railroad train in combination with a locomotive and caboose or coupled into a train otherwise made up of conventional railroad cars etc. Each of these rail units is comprised of a modified highway semi-trailer supported off the ground at each end by a modified railroad truck known as a trailer train mule. A trailer train is always comprised of one more mule than semi-trailer; that is, one semi-trailer and two mules; six semi-trailers and seven mules, etc. More particularly it relates to a combination of trailer train mules and highway semi-trailers with the mules having mounted thereon means for detachably connecting and supporting the front end of one trailer and the rear end of another trailer. Thus a multiple of such units comprise an articulated trailer train. Such a unit can be operated on the rails and the highway semi-trailer can be detached from the mules and operated over highways, roads, and streets with a conventional highway tractor.

Because of city traffic, the highway interurban carriers usually use large interurban semi-trailers to haul the freight between terminals and use small city semi-trailers to handle the freight to and from terminals. Because so many consignors and consignees are not served directly by the railroads, the rail carriers usually use freight cars to haul the freight between terminals and use small city semi-trailers to handle the freight to and from terminals. Experience has proven that the highway carriers can handle, collect and distribute freight cheaper per ton at the terminals and that the rail carriers can handle freight cheaper per ton between terminals. The present invention has as one of its primary objects, the combining of the advantages of both means of transportation and the elimination of the disadvantages of both means of transportation. This invention increases efficiency and reduces cost by eliminating in trailer lot shipments all intermediate loading of freight from the original loading at the consignor's and the final unloading at the consignee's and at the same time retaining the useful features of both the highway interurban carriers' service and the rail carriers' service. Thus, according to this invention, a highway tractor may pick-up a fully loaded trailer in the usual manner and bring it to the railroad freight station, and then, in a matter of a few minutes, the loaded trailer is attached to and supported by the trailer train mules. The train then delivers this trailer along with others, including conventional freight cars, to the railroad terminal nearest the destination of the trailer. At such terminal the trailer is quickly attached to a waiting highway tractor and the freight delivered to the point of ultimate destination. The transfer of the trailer from the highway tractor to the trailer train and vice versa, can be accomplished without additional help other than the regular train crew and the highway tractor driver. It will be understood that a number of disadvantages of long haul motor trucking can be avoided.

Other and further objects of the invention and the advantages of the same will be pointed out hereinafter and indicated in the appended claims or will be obvious to one skilled in the art upon understanding of the present disclosure.

For the purpose of this application there has been elected to set forth one particular structure, but it is to be understood that it is here presented for illustrative purposes only and is not to be accorded any interpretation such as might have the effect of limiting what is claimed as the invention short of its true and comprehensive scope in the art.

In order to accomplish the stated objects, there is provided a trailer train mule which includes a modified standard four wheel railroad truck equipped with air and hand brakes. On the truck spring plank is mounted a platform that is supported by the spring plank and at the end by the spring brackets and on this platform is supported a superstructure. The superstructure includes a second platform with an upright position amidships. The superstructure is held in position on the first platform by a lengthened king pin of a standard railroad truck and provided with bearings so that it may swivel in use. In order to practice the invention it will be necessary to provide a highway trailer, but few changes to the present well-known types of trailer need be made and these changes may be conveniently and inexpensively effected.

Thus, to equip the well known highway "semi-trailer" so that it may be included in the train for rail travel, it is necessary to provide a center sill which terminates short of the front and rear ends, the addition of an upper fifth wheel at the rear of the trailer and the securing at each end of the center sill swivelable railroad couplers.

Figure 6:
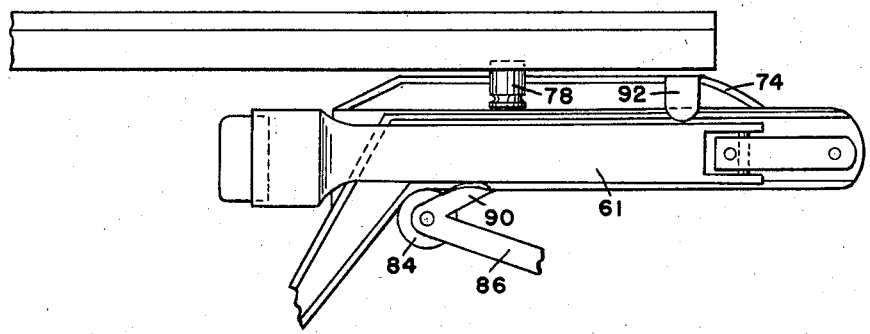
Figure 7:
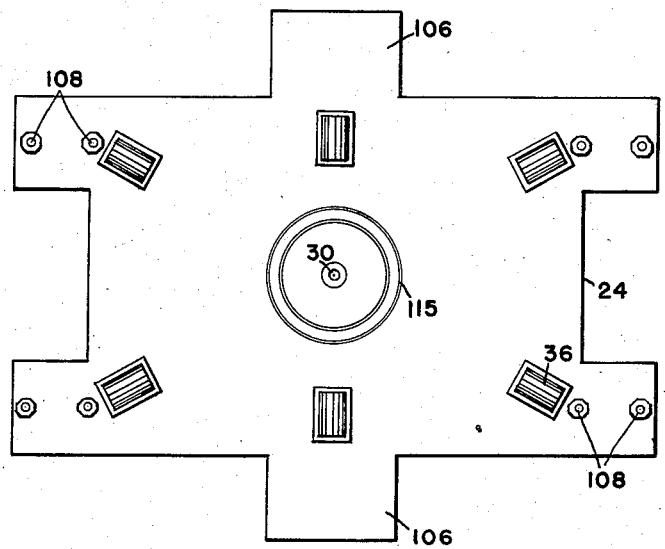
Figure 8:
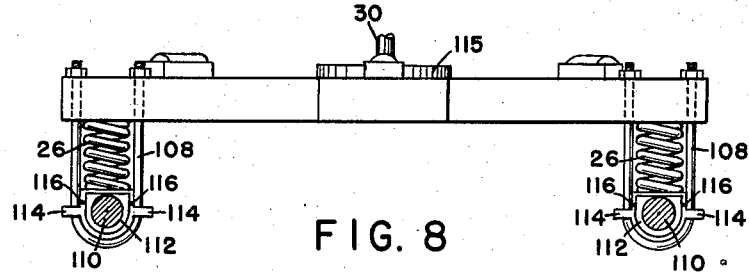
Figure 9:
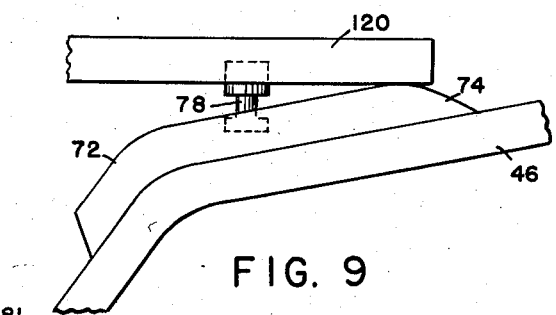
Figure 10:
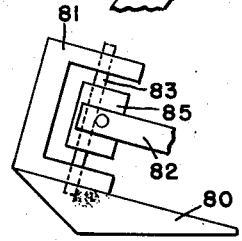

In the drawings:
Figure 1 is a vertical sectional view, with parts broken away, of a trailer train mule and two "semi-trailers" supported thereon;
Figure 2 is a side view, with parts broken away, of parts of the means for supporting the platform carrying the superstructure;
Figure 3 is a side view of one arrangement for holding the platform spring in place;
Figure 4 is a modified form, with parts broken away, of a modified means of supporting the platform springs;
Figure 5 is a top plan view of one-half of a trailer train with parts broken away;
Figure 6 is a side view of the coupler for trailer trains with parts broken away;
Figure 7 is a top plan view of a modified spring supported platform;
Figure 8 is a side view of the same;
Figure 9 is a view, with parts broken away, showing the position of the upper fifth wheel king pin when the trailer is being loaded on the trailer train mule; and,
Figure 10 is a side view, with parts broken away, showing the train couplers carried by the lifting racks.

The trailer train is composed of the following components:

A. Motive power which may be either conventional diesel, electric or steam locomotive or a rail truck.

B. "Semi-trailers" that can be moved either over the rails or the highways. Some of its salient features are: an upper fifth wheel on each end; a combination center sill and sub-frame and a standard swiveled railroad coupler on each end of the center sill. The upper fifth wheel supports the trailer and load on the trailer train mules and the couplers fasten the trailer to the trailer train mules. The tractive effort of the locomotive is exerted along a straight line parallel with the rails as in standard railroad practice. It is to be understood that the semi-trailers must be provided with train air lines and couplers.

C. A trailer train mule supports the rear end of one semi-trailer and the front end of the following semi-trailer and together form an articulated unit. Both ends of the trailer train mule are identical. The base of the trailer train mule is similar to a standard four wheel railroad truck equipped with train air, air and hand operated brakes. On the truck is a spring supported platform. On the platform is a swiveled superstructure with a crosswise upright. On each side of the upright is mounted a rubber insulated draft gear with studs running through the two draft gears and the upright so that one draft gear is complementary to the other. On each draft gear is mounted a lifting rack with a lower fifth wheel, two swiveled railroad couplers, lifting device, and one or more trailer hold down devices. The end of the lifting rack, remote from the draft gear, angles downward to support they running gear of the semi-trailer. The upper couplers are used with the semi-trailers, the lower couplers are used to connect the motive power, caboose and any standard railroad cars and trailer train mules when hauled without intervening semi-trailers.

The semi-trailer may be loaded at the consignee's door and hauled by a highway tractor to any train track. There they are formed into a train by using a trailer train mule between each two semi-trailers. At their destination the semi-trailers are removed from the trailer train mules and delivered by a highway tractor to the consignor's door.

Referring to the drawings in detail the railroad truck generally indicated at 10 is a standard truck similar to those shown in "Car Builder's Encyclopedia" of 1940, pages 1116 and 1117. The truck 10 includes wheels 12 adapted to rest upon track 14, spring box 16 supported by the truck frame, springs 18 mounted in the spring box 16, and spring plank 20. Suitably secured to the spring box 16 are arms 22 which extends longitudinally of the truck. A platform 24 is mounted on spring plank 20 and supported by springs 26 at each corner of the platform. The springs 26 are held in position by bolts 28 shown in detail in Figure 3. The trailer train mule superstructure is supported by the platform 24 and a king pin 30 extending from the platform 24 into the upright 34. Mounted on platform 24 are roller bearings 36, the bearing may be of the type shown on pages 1172 and 1173 of the publication above referred to.

Rubber pads 35 are positioned between header plates 38 and the upright 34. Studs and nuts 40 pass through the plates 38, rubber pads 35 and the upright 34 and hold the assembly together as a unit. Attached to the plates 38 are lug-like members 42 to which are hingedly connected by pins 44 lifting arms 46. The lifting arms may be U-shaped channel members. The free ends of the lifting arms 46 are in a plane below the pin 44. The ends are provided with axle lifting openings 48. There is hingedly mounted on the pin 44 by member 41 a lifting means 50 which may be a well known mechanical or hydraulic jack, a well known air jack or, in fact, any suitable known lifting and lowering means may be employed.

The lifting means 50 is hingedly connected to the pin 44 at one end and the other end to cross shaft 52. For connecting a trailer to the trailer train a coupler 54 is swivelly connected to the combination sub-frame and central sill 56 of the trailer, generally indicated as at 58. It is to be understood that the semi-trailer 58 is provided with the standard train air lines and connections (not shown). To hold the semi-trailer in position on the trailer train, hold down means 60 are carried by the plates 38 and removably secured to the semi-trailer at 62. It is to be understood that the hold down means can be attached as shown in Figure 1 but it is preferred that it be secured on pin 44 as shown in Figure 5.

A coupler 61 for connecting a semi-trailer to the trailer train mule is hingedly mounted on pin 66 which is operatively mounted in substantially Y-shaped member 68. The Y-shaped member 68 is hingedly mounted on pin 44.

Secured to the lifting arms is plate member 70 which may be termed a lower fifth wheel and is curved downwardly at 72 and at the rear end at 74. There is an opening 76 in member 70 into which king pin 78 of the trailer rides. The opening 76 has substantially parallel walls at 81 and the opening slants outwardly toward the open end. The opening in the sloped portion 72 must be of sufficient opening to permit free movement of the coupler 61. A plate member 79 is secured to the arms 46 and the swivelly mounted coupler 82 is supported thereby. This coupler is employed when the trailer train is to be attached to a regular railroad car or the like. The arms 46 must be lifted so that the coupler 82 is of standard height above the top of the rails 14 and substantially parallel when in use.

Mounted on shaft 52 are rollers 84 which roll in contact with the bottom of the arms 46 when they are being raised or lowered. Arms 86 are attached to the shaft 52 at one end and hingedly attached to the platform at 88. The end of the arm 90 contacts the bottom of the coupler 61 and it with the block 92 holds the coupler 61 in substantially a straight line positioned a predetermined distance above the rail 14 when the lifting arms 46 are being lowered.

The platform 24 is supported at the corners as shown in Figure 1 or Figure 4 and a bolt-like member 28 is employed for this purpose. Figure 3 discloses the bolt 28 provided with head 94, steel washers 96 and rubber pads 98. This arrangement provides efficient means for holding springs 26 between supports 22 and platform 24. One of the washers is placed on each side of rubber pads and such assembly is positioned at each end of the springs 26.

In Figure 4 is shown a modified form of supporting the platform 24 at the corners. In this arrangement arms 102 extend from frame 104 of the standard railroad truck. The arm 102 must be so arranged that room is provided between it and the wheel 12 for the usual brake equipment.

In Figures 7 and 8 is shown the preferred means of supporting the platform 24. The ear-like members 106 of the platform 24 rest upon the spring plank 20. On each corner is secured U bolts 108 which are mounted around the axles 110 of the railway truck. Suitable bearings 112 which are provided with spaced ears 114 are mounted on the axles 110. These bearings are split at 116 so that they may be easily placed in position. The spring 26 is positioned between the top of bearing 112 and the bottom of the platform 24. On the platform is positioned bearing 36, it is to be understood the arrangement of the bearing may be varied from that shown in Figure 7. The king pin 30 is carried by the platform and around the king pin 30 is positioned bearing 115. The superstructure rests upon platform bearings 36 and the bearing 115 and is held in place by king pin 30.

In Figure 9 is shown the semi-trailer loading position and indicates that the king pin 78 of the upper fifth wheel does not go all the way to the end of the opening 76. The tractive effort is in a straight line through the center sills, the couplers swivelly attached to each end of the sill and the couplers on the trailer train mule. The highway trailers 58 are provided with an upper fifth wheel at each end of the combination sub-frame and center sill. The coupler 54, swivelly attached to the center sill, is provided with block member 121 to aid in keeping the coupler 54 in proper alignment and distance below the upper fifth wheel plate of the highway trailer.

In Figure 10 is shown the lower couplers 82, mounting means which includes plate 80, bracket 81 mounted on plate 80, pin 83 and member 85. This permits a swivel mounting for the coupler 82.

It is to be understood that the details of construction may be changed without departing from the scope of the combination of a highway trailer having a sub-frame, a center sill, a fifth wheel at each end of the sill, and swively mounted coupler attached to the sill, and a trailer train mule for supporting the front end of one trailer and the rear end of another trailer.

When the lifting arms 46 are in the raised position any suitable means may be employed, such as blocks hingedly mounted on the platform 32, for relieving raising means 50 in holding the arms in raised position.

It is also to be understood that the special fifth wheel assembly shown may be replaced by a standard fifth wheel assembly without departing from the scope of the invention.

What is claimed is:

1. In an apparatus for supporting highway trailers comprising a railway truck, a supported platform carried by the railway truck, a swivelly mounted platform supported by the first mentioned platform, an upright member attached to and mounted crosswise of the swivelly mounted platform, two pairs of lifting racks pivotally attached to the upright members, means for raising and lowering the racks, a plate member forming a fifth wheel carried by each pair of arms, and couplers pivotally attached to the upright member.

2. A highway trailer having a center sill, an upper fifth wheel at each end of the trailer center sill, a railway car coupler connected to the center sill at each end, in combination with a railway truck having wheeled axles, a superstructure swively mounted on the railway truck, two pairs of lifting racks pivotally mounted on the superstructure, power means for raising and lowering the racks, railway couplers swively mounted on the superstructure and operatively connected to the couplers on one end of the center sill, and lower fifth wheels mounted on the racks, said lower fifth wheel supporting a fifth wheel on said highway trailer.

3. A highway trailer having a sub-frame, an upper fifth wheel on each end of the trailer, a railway coupler swivelly connected to the sub-frame adjacent the fifth wheel, a reversible railway trailer train mule consisting of a railway truck having wheeled axles, a swivelably mounted platform on the railway truck, an upright member mounted on the platform, raisable and lowerable arms operatively mounted on the platform and connected to the upright, means for raising and lowering the arms, and railway couplers operatively connected to the said platform and detachably connecting the trailer train to the highway trailer.

4. In an apparatus for supporting highway trailers comprising a railway truck having wheeled axles, a platform operatively mounted on the axles, a second platform swivelley mounted on the first mentioned platform, an upright member mounted on the second mentioned platform and extending crosswise thereof, a pair of lifting racks hingedly supported by the upright member, a fifth wheel plate mounted on each of the lifting racks, railway couplers hingedly attached to the upright member, railroad couplers hingedly mounted on the lifting racks, and power means for raising and lowering the lifting racks.

5. A highway trailer having a center sill, an uuper fifth wheel at each end of the trailer, a train coupler at each end of the center sill in combination with a rail carrier unit for supporting the front and rear end of the highway trailer, said rail carrier comprising a railway truck, a spring supported platform, a swivelly mounted platform on the first mentioned platform and rail couplers operatively mounted on the swivel platform, said couplers carried by the swivel platform connected to the couplers carried by the trailer center sill whereby force applied when moving the highway trailer and the rail carrier is applied in substantially straight line parallel to the railroad tracks.

6. A highway trailer having a center sill, a fifth wheel at each end of the highway trailer, a railway coupler attached to the ends of said center sill, a railway trailer carrier having raisable and lowerable fifth wheels which in the raised position support a fifth wheel on said highway trailer, said railway trailer carrier comprising a railway truck having wheeled axles, a platform mounted on said axles, a superstructure swivelably mounted on said platform, railway couplers attached to the superstructure, said last mentioned railway couplers detachably connected to the said railway couplers on said center sill of the highway trailer.

7. A highway trailer having a sub-frame, an upper fifth wheel on each end of the said trailer, railway couplers attached to the sub-frame, a reversible railway trailer comprising a railway truck having wheeled axles, a platform mounted on the said wheeled axles, a swivelably mounted superstructure on said platform, raisable and lowerable arms operatively connected to the platform, means for raising and lowering the arms, railway couplers connected to the swivelable superstructure and detachably connected to a railway coupler attached to the said sub-frame and fifth wheel means supported by said arms upon which one of the said upper fifth wheels on said highway trailer rests.

8. A highway trailer having a center sill, a fifth wheel at each end of the said highway trailer, a railroad coupler attached to the ends of the center sill, a railroad trailer carrier comprising a railroad truck having wheeled axles, a platform mounted on the said axles, a superstructure swivelably mounted on said platform, railroad couplers attached to the said superstructure, said last mentioned railroad couplers detachably connected to one of said railroad couplers on said highway trailer's center sill, and a raisable and lowerable fifth wheel operatively supported by said platform, said last mentioned fifth wheel supporting a fifth wheel on said highway trailer.

References Cited in the file of this patent

UNITED STATES PATENTS

| | | |
|---|---|---|
| 2,066,836 | Hughes | Jan. 5, 1937 |
| 2,263,578 | Hickman | Nov. 25, 1941 |
| 2,709,969 | Andert | June 7, 1955 |